(12) United States Patent
Padhi et al.

(10) Patent No.: US 12,704,063 B2
(45) Date of Patent: Aug. 11, 2026

(54) COMPUTING $A_0$ MODE ATTENUATION FOR CEMENT EVALUATION IN CASED WELLS

(71) Applicant: Halliburton Energy Services, Inc., Houston, TX (US)

(72) Inventors: Amit Padhi, Houston, TX (US); Qingtao Sun, Houston, TX (US); Chung Chang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 28 days.

(21) Appl. No.: 18/525,063

(22) Filed: Nov. 30, 2023

(65) Prior Publication Data

US 2025/0179916 A1 Jun. 5, 2025

(51) Int. Cl.
*E21B 47/16* (2006.01)
*E21B 47/005* (2012.01)
*G01V 1/50* (2006.01)

(52) U.S. Cl.
CPC ............ *E21B 47/16* (2013.01); *E21B 47/005* (2020.05); *G01V 1/50* (2013.01); *G01V 2210/1429* (2013.01)

(58) Field of Classification Search
None
See application file for complete search history.

(56) References Cited

U.S. PATENT DOCUMENTS

H924 H * 6/1991 Chimenti ............... G01N 29/11 73/644
6,125,079 A * 9/2000 Birchak ................... G01V 1/44 367/28
9,702,244 B2 7/2017 Willis et al.
10,317,555 B2 6/2019 Li et al.
10,481,288 B2 11/2019 Chang et al.
10,571,584 B2 2/2020 Padhi
10,663,612 B2 5/2020 Wang et al.
10,670,761 B2 6/2020 Wang et al.
11,112,519 B2 9/2021 Wang et al.
11,209,565 B2 12/2021 Wang et al.
11,243,326 B2 2/2022 Ge et al.

(Continued)

OTHER PUBLICATIONS

International Search Report and Written Opinion for International Patent Application No. PCT/US2023/084837 dated Aug. 27, 2024. PDF file. 8 pages.

(Continued)

*Primary Examiner* — Steven Lim
(74) *Attorney, Agent, or Firm* — John Wustenberg; C. Tumey Law Group PLLC

(57) ABSTRACT

A method and system acoustic logging operations. The method may comprise selecting a transmitter to a casing offset for logging operations, wherein the transmitter is disposed on a logging tool, insonifying at least a part of a casing with the transmitter at an angle of incidence and collecting one or more waveforms with an array of receivers disposed on the logging tool. The method may further comprise identifying one or more wave mode travel times from the one or more waveforms, selecting one or more wavelets from the one or more waveforms, and identifying an attenuation of a lamb wave mode based at least in part on the one or more wave mode travel times and the one or more wavelets.

18 Claims, 7 Drawing Sheets

(56) References Cited

U.S. PATENT DOCUMENTS

| | | | |
|---|---|---|---|
| 11,385,374 | B2 | 7/2022 | Wang et al. |
| 11,512,586 | B2 | 11/2022 | Sun et al. |
| 11,519,255 | B2 | 12/2022 | Li et al. |
| 11,550,073 | B2 | 1/2023 | Wang et al. |
| 11,567,228 | B2 | 1/2023 | Zhao et al. |
| 11,650,346 | B2 | 5/2023 | Chang et al. |
| 11,662,495 | B2 | 5/2023 | Chang et al. |
| 11,662,496 | B2 | 5/2023 | Cabella et al. |
| 11,808,136 | B2 | 11/2023 | Rego et al. |
| 2007/0206439 | A1* | 9/2007 | Barolak ................ E21B 47/005 367/35 |
| 2014/0177389 | A1* | 6/2014 | Bolshakov ............... G01V 1/50 367/35 |
| 2016/0245077 | A1 | 8/2016 | Willis et al. |
| 2017/0212260 | A1 | 7/2017 | Padhi |
| 2017/0299751 | A1 | 10/2017 | Chang et al. |
| 2017/0371058 | A1 | 12/2017 | Li et al. |
| 2018/0067223 | A1 | 3/2018 | Le Calvez et al. |
| 2019/0018161 | A1 | 1/2019 | Wang et al. |
| 2019/0018162 | A1 | 1/2019 | Wang et al. |
| 2019/0025452 | A1 | 1/2019 | Wang et al. |
| 2019/0101663 | A1 | 4/2019 | Walters et al. |
| 2019/0204468 | A1 | 7/2019 | Ge et al. |
| 2019/0257971 | A1 | 8/2019 | Wang et al. |
| 2019/0317238 | A1 | 10/2019 | Wang et al. |
| 2020/0116005 | A1 | 4/2020 | Li et al. |
| 2021/0123731 | A1 | 4/2021 | Chang et al. |
| 2021/0140302 | A1* | 5/2021 | Sirevaag ............ G01N 29/4418 |
| 2021/0208299 | A1 | 7/2021 | Wang et al. |
| 2021/0285324 | A1 | 9/2021 | Sirevaag |
| 2021/0286099 | A1 | 9/2021 | Wang et al. |
| 2022/0106873 | A1 | 4/2022 | Sun et al. |
| 2022/0268959 | A1* | 8/2022 | Walker ..................... G01V 1/52 |
| 2022/0365240 | A1* | 11/2022 | Imrie .................... E21B 47/005 |
| 2023/0039040 | A1 | 2/2023 | Malmberg et al. |
| 2023/0136442 | A1 | 5/2023 | Hayman et al. |
| 2023/0280489 | A1 | 9/2023 | Chang et al. |
| 2023/0340873 | A1* | 10/2023 | Tiwari ..................... G01V 1/52 |

OTHER PUBLICATIONS

Duan, Wen-Xing et al. “Acoustic evaluation of cementing quality using obliquely incident ultrasonic signals.” Applied Geophysics Journal, vol. 11, No. 3, Sep. 2014. PDF file. 8 pages.

Tao, Bei et al. “Rough interfaces and ultrasonic imaging logging behind casing.” Applied Geophysics Journal, vol. 13, No. 4, Dec. 2016. PDF file. 6 pages.

Zeroug, et al., Ultrasonic Leaky-Lamb Wave Imaging Through a Highly Contrasting layer, 2003 IEEE Ultrasonics Symposium-794.

Zeroug, et al., Sonic and Ultrasonic Measurement Applications for cased Oil Wells, 19th World Conference on Non-Destructive Testing 2016.

Wang, et al., ASA, Understanding acoustic methods for cement bond logging, J. Acoust. Soc. Am. 139, May 2016.

Lamb, On Waves in an Elastic Plate, 1916. Proc. R. Soc. Lond. A 1917 93, 114-128.

* cited by examiner

COMPUTING $A_0$ MODE ATTENUATION FOR CEMENT EVALUATION IN CASED WELLS

BACKGROUND

In the drilling of oil and gas wells, a wellbore is formed using a drill bit at the lower end of a drill string. The drill bit is rotated while force is applied through the drill string and against the rock face of the formation being drilled. After drilling to a predetermined depth, the drill string and bit are removed, and the wellbore is lined with a string of casing. An annular area is thus formed between the string of casing and the formation penetrated by the wellbore.

A cementing operation is typically conducted to displace drilling fluid and fill part or all of the hollow-cylindrical annular area between the casing and the borehole wall with cement. The combination of cement and casing strengthens the wellbore and facilitates the zonal fluid isolation of certain sections of a hydrocarbon-producing formation (or "pay zones") behind the casing. The first string of casing is placed from the surface and down to a first drilled depth. This casing is known as a surface casing. In the case of offshore operations, this casing may be referred to as a conductor pipe. Typically, one of the main functions of the initial string(s) of casing is to isolate and protect the shallower, usable water bearing aquifers from contamination by any other wellbore fluids. Accordingly, these casing strings are almost always cemented entirely back to surface. One or more intermediate strings of casing are also run into the wellbore. These casing strings will have progressively smaller outer diameters into the wellbore. In most current wellbore completion jobs, especially those involving so called unconventional formations where high-pressure hydraulic operations are conducted downhole, these casing strings may be entirely cemented. In some instances, an intermediate casing string may be a liner, that is, a string of casing that is not tied back to the surface.

The process of drilling and then cementing progressively smaller strings of casing is repeated several times until the well has reached total depth. In some instances, the final string of casing is also a liner. The final string of casing, referred to as a production casing, is also typically cemented into place.

It is important that the cement sheath surrounding the casing strings have a high degree of circumferential and axial integrity around the casing annulus against fluid channeling or flowing through the cement along the wellbore. The cement must also bond with the casing surface and borehole wall to perform a hydraulic seal against fluid migration along the wellbore. This means that the cement is fully placed into the annular region to prevent fluid communication between fluids at the level of subsurface completion and aquifers residing just below the surface. Such fluids may include fracturing fluids, aqueous acid, and formation fluids.

BRIEF DESCRIPTION OF THE DRAWINGS

These drawings illustrate certain aspects of some examples of the present disclosure and should not be used to limit or define the disclosure.

DETAILED DESCRIPTION

Figure 1:
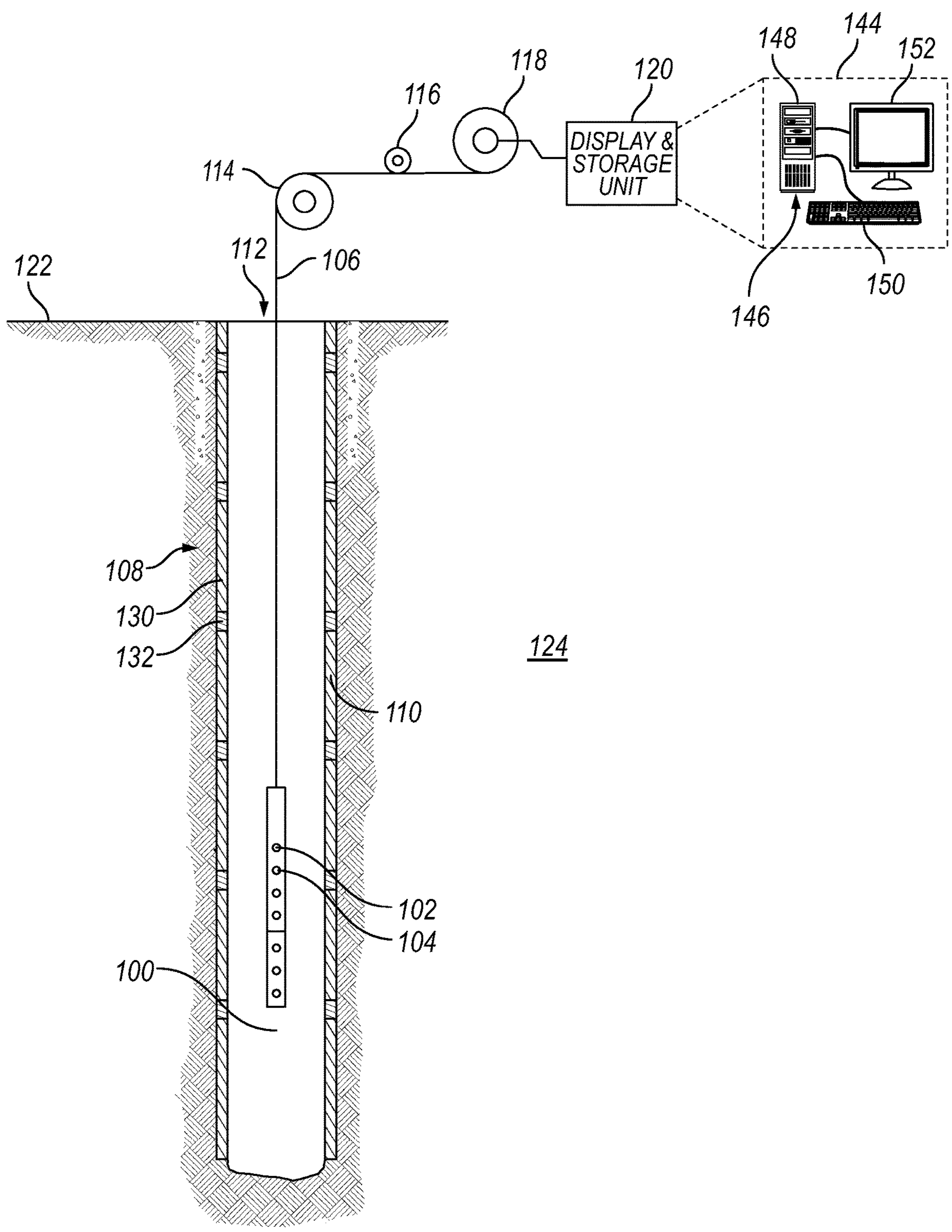
FIG. 1 illustrates an example of an operating environment for an acoustic logging tool according to an embodiment of the present disclosure.

The present disclosure relates to the field of well drilling and completions, and more specifically to the evaluation of cement integrity behind a casing string using acoustic signals. During logging operations, $A_0$ acoustic signals may be utilized to measure and determine cement bonding between a casing and cement. An $A_0$ wave mode may be generated in a casing at specific angles of incidence and frequency ranges. The predictions for optimal angles and frequencies may be made by computing velocity-frequency dispersion curves and then converting velocities to angles for the particular logging fluid in which transducers are dipped. Methods and systems described below may comprise theoretical predictions of angle of incidence and frequency ranges with optimized transducer firing to generate high quality $A_0$ waveform data with an array of receivers. The array data may then be processed in a least squares sense to get accurate $A_0$ attenuation values. Additionally, methods and systems described below may comprise optimizing transducers (both source and receiver array) to casing offset to generate higher fidelity data while minimizing impact of logging fluid attenuation.

Collecting $A_0$ waveform data with angle of incidence, frequency ranges and transducer-casing offset optimized for casing specifications and logging fluid under consideration is not offered in any existing technology. Additionally, calculating $A_0$ attenuation using an array of receivers with at least three receivers and incorporating least squares based approach to mitigate impact of lower SNR is not offered by any technology offering.

During measurement operations, ultrasonic waveform data may be gathered using various techniques, such as a pitch-catch technique performed using transducers in a pitch-catch arrangement. The ultrasonic waveform data collected by the pitch-catch arrangement includes leaky-Lamb wave measurements which may be classified into symmetric mode and antisymmetric mode components. The flexural mode or zero-order antisymmetric mode ($A_0$) and symmetric mode ($S_0$) are highly dispersive in certain frequency ranges. Further, the flexural mode is sensitive to the interface between casing and cement. Herein are described methods and systems to evaluate cement integrity behind casing strings using the attribute of the symmetric mode ($S_0$) and the antisymmetric mode ($A_0$) from a pitch-catch configuration with optimized transducer angle and firing frequency to excite the symmetric mode ($S_0$) and antisymmetric mode ($A_0$) in the casing. The attribute of the symmetric mode ($S_0$) and antisymmetric mode ($A_0$) may be defined as the integral of the absolute values of waveform amplitudes of the ($A_0$+$S_0$) measurement.

As disclosed herein, acoustic logging tools and methods that may be used to emit an acoustic signal which may traverse through at least part of a casing string to at least part of the cement to at least part of the cement-formation section. Reflected signals are measured by the acoustic logging tool. Lamb wave (traversing through the casing) signals may be analyzed to determine if the section of casing is fully bonded to the cement, or is free pipe, or is partially bonded to the cement, for example. Further, the analysis of the leaked (from lamb waves) and reflected signals may determine if the cement is bonded to the formation or partially bonded to the formation.

The integrity of a cement sheath may be determined through the use of a cement bond log. A cement bond log uses an acoustic signal that is transmitted by a logging tool at the end of a wireline. The logging tool includes a transmitter, and then a receiver that "listens" for sound waves generated by the transmitter through the surrounding casing strings. The logging tool includes a signal processor that takes a continuous measurement of the amplitude of sound pulses from the transmitter to the receiver. The theory behind the cement bond log is that the amplitude of an ultrasonic waveform as it travels through a well cemented pipe is only a fraction of the amplitude through uncemented pipe. Acoustic waveforms in free steel casing generally provide a large amplitude because the acoustic energy remains in the steel. However, for casing that is surrounded by and well bonded with cement, the amplitude is small because the acoustic energy is dispersed not only in the steel but also into the coupled cement and formation. Bond logs may also measure acoustic impedance of the cement or other material in the annulus behind the casing by resonant frequency decay.

FIG. 1 illustrates an operating environment for an acoustic logging tool 100 as disclosed herein. Acoustic logging tool 100 may comprise a transmitter 102 and a receiver 104. Additionally, transmitter 102 and receiver 104 may be configured to rotate in acoustic logging tool 100. In examples, there may be any number of transmitters 102 and/or any number of receivers 104, which may be disposed on acoustic logging tool 100. Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by acoustic logging tool 100 may be stored on memory and then processed by display and storage unit 120 after recovery of acoustic logging tool 100 from wellbore 110. Alternatively, signals recorded by acoustic logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to acoustic logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. Additionally, casing string 108 may be referred to as a plurality of tubing.

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to surface 122 during logging.

Acoustic logging tool 100 may be used for excitation of transmitter 102. As illustrated, one or more receivers 104 may be positioned on the acoustic logging tool 100 at selected distances (e.g., axial spacing) away from transmitter 102. The axial spacing of receiver 104 from transmitter 102 may vary, for example, from about 0 inches (0 cm) to about 40 inches (101.6 cm) or more. In some embodiments, at least one receiver 104 may be placed near the transmitter 102 (e.g., within at least 1 inch (2.5 cm) while one or more additional receivers may be spaced from 1 foot (30.5 cm) to about 5 feet (152 cm) or more from the transmitter 102. It should be understood that the configuration of acoustic logging tool 100 shown on FIG. 1 is merely illustrative and other configurations of acoustic logging tool 100 may be used with the present techniques. In addition, acoustic logging tool 100 may include more than one transmitter 102 and more than one receiver 104. For example, an array of receivers 104 may be used. Transmitter 102 may include any suitable acoustic source for generating acoustic waves downhole, including, but not limited to, monopole and multipole sources (e.g., dipole, cross-dipole, quadrupole, hexapole, or higher order multi-pole transmitters). Additionally, one or more transmitters 102 (which may include segmented transmitters) may be combined to excite a mode corresponding to an irregular/arbitrary mode shape. Specific examples of suitable transmitters 102 may include, but are not limited to, piezoelectric elements, bender bars, or other transducers suitable for generating acoustic waves downhole. Receiver 104 may include any suitable acoustic receiver suitable for use downhole, including piezoelectric elements that may convert acoustic waves into an electric signal.

Figure 2:
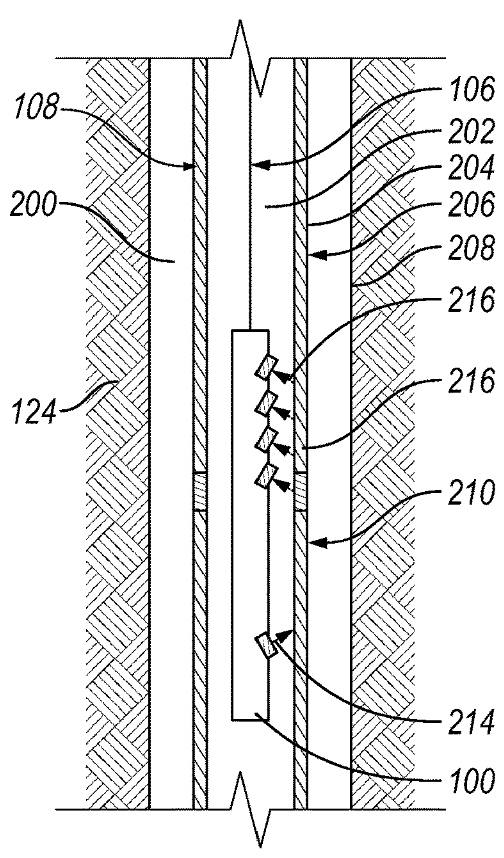
FIG. 2 illustrates another example of acoustic logging tool during logging operations according to another embodiment of the present disclosure.

Transmission of acoustic waves by the transmitter 102 and the recordation of signals by receivers 104 may be controlled by display and storage unit 120, which may include an information handling system 144. As illustrated, the information handling system 144 may be a component of the display and storage unit 120. Alternatively, the information handling system 144 may be a component of acoustic logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). Non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with acoustic logging tool 100 and/or software executed by processing unit 146. For example, information handling system 144 may enable an operator to select analysis options, view collected log data, view analysis results, and/or perform other tasks, FIG. 2 illustrates acoustic logging tool 100 during logging operations. As illustrated, logging operations (for the methods and systems discussed below) may utilize sonic or ultrasonic pitch catch flexural waves generated from one or more transmitters 102 (referring to FIG. 1) and recorded by a plurality of at least one receiver 104 to predict a material state of material 200 behind casing string 108. During operations, logging tool 100 is suspended in mud 202 by conveyance 106. As noted above, to form an acoustic log, sonic or ultrasonic pitch catch flexural waves are generated and recorded. Both waves, which are produced by different systems and methods on acoustic logging tool 100, may be used to analyze material 200 behind casing string 108. As illustrated, there may be at least three interfaces in which acoustic waves may reflect and/or refract. Those interfaces are a first interface 204, a second interface 206, and third interface 208. First interface 204 is defined as a location in which mud 202 contacts the inner surface of casing string 108. At a first interface a large reflection may occur, however acoustic waves which refract through a first interface may approach a second interface 206. Second interface 206 is defined as a location in which the outer surface of casing string 108 contacts with a material 200. The acoustic waves which refract through second interface 206 may be implemented to evaluate material 200. Third interface 208 is defined as a location in which material 200 contacts formation 124 or a second casing.

For pitch-catch methods 210, transmitters 102 and at least one receiver 104 may be tilted with respect to a longitudinal axis of acoustic tool 100. As disused in the disclosure, tilt may be computed based on the environment in which the acoustic tool 100 may be disposed, such as water-based mud compared to oil-based mud. This may allow for generation of sonic or ultrasonic waves 214 from transmitter 102 to travel between any of the above identified interfaces and be recorded by at least one receiver 104 as one or more flexural waves 216. Flexural waves 216 may be sonic or ultrasonic waves 214. The acoustic log may further be processed to process the recorded flexural waves ($S_0$ and $A_0$) 216 and S1 mode wave to determine the material 200 behind casing string 108.

Figure 3:
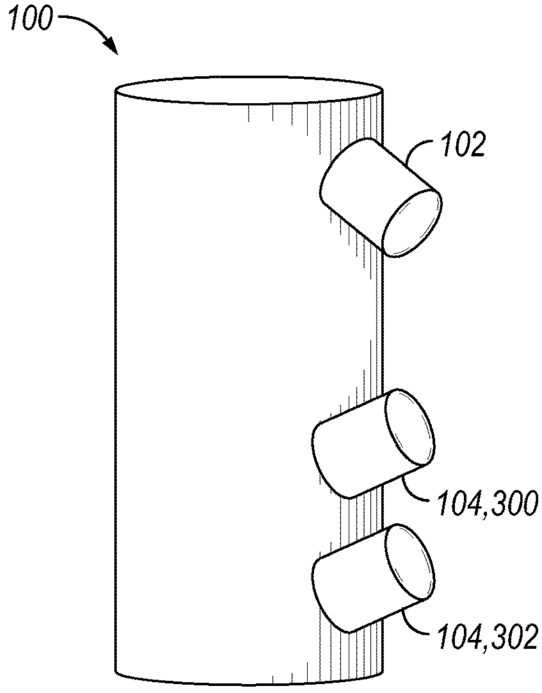
FIG. 3 is a perspective view of another example of acoustic logging tool according to another embodiment of the present disclosure.

FIG. 3 is a perspective view of acoustic logging tool 100. As illustrated, transmitters 102 and at least one receiver 104 are inverted, as compared to the embodiments in FIGS. 1 and 2. However, acoustic logging tool 100 and the methods described may still operate and function the same way as described above and below. As illustrated, acoustic logging tool 100 may comprise a transmitter 102 and at least one receiver 104, which may be arranged in a pitch and catch configuration. That is, transmitter 102 may be a pitch transducer, and at least one receiver 104 may be near and far catch transducers spaced at suitable near and far axial distances from transmitter 102, respectively. In such a configuration, transmitter 102 (i.e., may also be referred to as a source pitch transducer) emits sonic or ultrasonic waves while at least one receiver 104 (i.e., may also be referred to as catch transducers) receive the sonic or ultrasonic waves after reflection and/or refraction from the wellbore fluid, casing, coating, cement, and formation and record the received waves as time-domain waveforms. At least one receiver 104 may further be identified as near receiver 300 and far receiver 302. Near receiver 300 being at least one receiver 104 closest to transmitter 102 and far receiver 302 being at least one receiver 104 the furthest away from transmitter 102. Because the distance between near receiver 300 and far receiver 302 is known, differences between the reflected and/or refracted waveforms received by at least one receiver 104 provide information about attenuation that may be correlated to material 200 (e.g., referring to FIG. 2) in the annular wellbore region, and they allow a circumferential depth of investigation around wellbore 110 (e.g., referring to FIG. 1).

The pitch-catch transducer pairing may have different frequency, spacing, and/or angular orientations based on environmental effects and/or tool design. For example, if transmitter 102 and at least one receiver 104 operate in the sonic range, spacing ranging from three to fifteen feet may be appropriate, with three and five feet spacing being also suitable. If transmitter 102 and at least one receiver 104 operate in the sonic or ultrasonic range, the spacing may be less. As noted above, reflected/refracted flexural waveforms ($A_0$) 216 (e.g., referring to FIG. 2) that are recorded may be further processed into an acoustic log to determine material 200 (e.g., referring to FIG. 2) behind casing string 108 (e.g., referring to FIG. 1).

Figure 4:
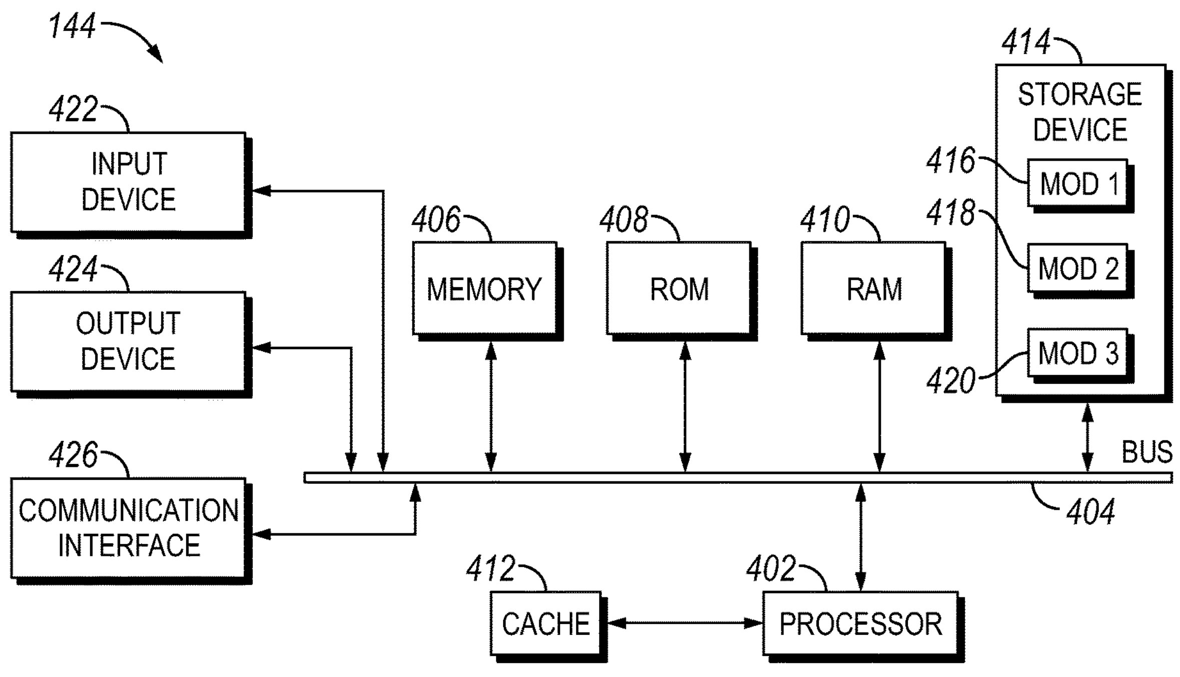
FIG. 4 illustrates an example of an information handling system according to an embodiment of the present disclosure.

FIG. 4 illustrates an example information handling system 144 (referring to FIG. 1) which may be employed to perform various steps, methods, and techniques disclosed herein. As illustrated, information handling system 144 includes a processing unit (CPU or processor) 402 and a system bus 404 that couples various system components including system memory 406 such as read only memory (ROM) 408 and random-access memory (RAM) 410 to processor 402.

Processors disclosed herein may all be forms of this processor 402. Information handling system 144 may include a cache 412 of high-speed memory connected directly with, in close proximity to, or integrated as part of processor 402. Information handling system 144 copies data from memory 406 and/or storage device 414 to cache 412 for quick access by processor 402. In this way, cache 412 provides a performance boost that avoids processor 402 delays while waiting for data. These and other modules may control or be configured to control processor 402 to perform various operations or actions. Another system memory 406 may be available for use as well. Memory 406 may include multiple different types of memory with different performance characteristics. It may be appreciated that the disclosure may operate on information handling system 144 with more than one processor 402 or on a group or cluster of computing devices networked together to provide greater processing capability. Processor 402 may include any general-purpose processor and a hardware module or software module, such as first module 416, second module 418, and third module 420 stored in storage device 414, configured to control processor 402 as well as a special-purpose processor where software instructions are incorporated into processor 402. Processor 402 may be a self-contained computing system, containing multiple cores or processors, a bus, memory controller, cache, etc. A multi-core processor may be symmetric or asymmetric. Processor 402 may include multiple processors, such as a system having multiple, physically separate processors in different sockets, or a system having multiple processor cores on a single physical chip. Similarly, processor 402 may include multiple distributed processors located in multiple separate computing devices but working together such as via a communications network. Multiple processors or processor cores may share resources such as memory 406 or cache 412 or may operate using independent resources. Processor 402 may include one or more state machines, an application specific integrated circuit (ASIC), or a programmable gate array (PGA) including a field PGA (FPGA).

The information handling system 144 may comprise a processor 402 that executes one or more instructions for processing the one or more measurements. The information handling system 144 may comprise processor 402 that executes one or more instructions for processing the one or more measurements. Information handling system 144 may process one or more measurements according to any one or more algorithms, functions, or calculations discussed below. In one or more embodiments, the information handling system 144 may output a return signal.

Processor 402 may include, for example a microprocessor, microcontroller, digital signal processor (DSP), application specific integrated circuit (ASIC), or any other digital or analog circuitry configured to interpret, execute program instructions, process data, or any combination thereof. Processor 402 may be configured to interpret and execute program instructions or other data retrieved and stored in any memory such as memory 406 or cache 412. Program instructions or other data may constitute portions of a software or application for carrying out one or more methods described herein. memory 406 or cache 412 may comprise read-only memory (ROM), random access memory (RAM), solid state memory, or disk-based memory. Each memory module may include any system, device or apparatus configured to retain program instructions, program data, or both for a period of time (e.g., computer-readable non-transitory media). For example, instructions from a software or application may be retrieved and stored in memory 406 for execution by processor 402.

Each individual component discussed above may be coupled to system bus 404, which may connect each and every individual component to each other. System bus 404 may be any of several types of bus structures including a memory bus or memory controller, a peripheral bus, and a local bus using any of a variety of bus architectures. A basic input/output (BIOS) stored in ROM 408 or the like, may provide the basic routine that helps to transfer information between elements within information handling system 144, such as during start-up. Information handling system 144 further includes storage devices 414 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 414 may include software modules 416, 418, and 420 for controlling processor 402. Information handling system 144 may include other hardware or software modules. Storage device 414 is connected to the system bus 404 by a drive interface. The drives and the associated computer-readable storage devices provide nonvolatile storage of computer-readable instructions, data structures, program modules and other data for information handling system 144. In one aspect, a hardware module that performs a particular function includes the software component stored in a tangible computer-readable storage device in connection with the necessary hardware components, such as processor 402, system bus 404, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 144 is a small, handheld computing device, a desktop computer, or a computer server. When processor 402 executes instructions to perform "operations", processor 402 may perform the operations directly and/or facilitate, direct, or cooperate with another device or component to perform the operations.

As illustrated, information handling system 144 employs storage device 414, which may be a hard disk or other types of computer-readable storage devices which may store data that are accessible by a computer, such as magnetic cassettes, flash memory cards, digital versatile disks (DVDs), cartridges, random access memories (RAMs) 410, read only memory (ROM) 408, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 144, an input device 422 represents any number of input mechanisms, such as a microphone for speech, a touch-sensitive screen for gesture or graphical input, keyboard, mouse, motion input, speech and so forth. Additionally, input device 422 may take in data from one or more sensors. An output device 424 may also be one or more of a number of output mechanisms known to those of skill in the art. In some instances, multimodal systems enable a user to provide multiple types of input to communicate with information handling system 144. Communications interface 426 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 402, that is purpose-built to operate as an equivalent to software executing on a general-purpose processor. For example, the functions of one or more processors presented in FIG. 4 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 408 for storing software performing the operations described below, and random-access memory (RAM) 410 for storing results. Very large-scale integration (VLSI) hardware embodiments, as well as custom VLSI circuitry in combination with a general-purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 144 may practice all or part of the recited methods, may be a part of the recited systems, and/or may operate according to instructions in the recited tangible computer-readable storage devices. Such logical operations may be implemented as modules configured to control processor 402 to perform particular functions according to the programming of software modules 416, 418, and 420.

In examples, one or more parts of the example information handling system 144, up to and including the entire information handling system 144, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization computer layer may operate on top of a physical computer layer. The virtualization computer layer may include one or more virtual machines, an overlay network, a hypervisor, virtual switching, and any other virtualization application.

Figure 5:
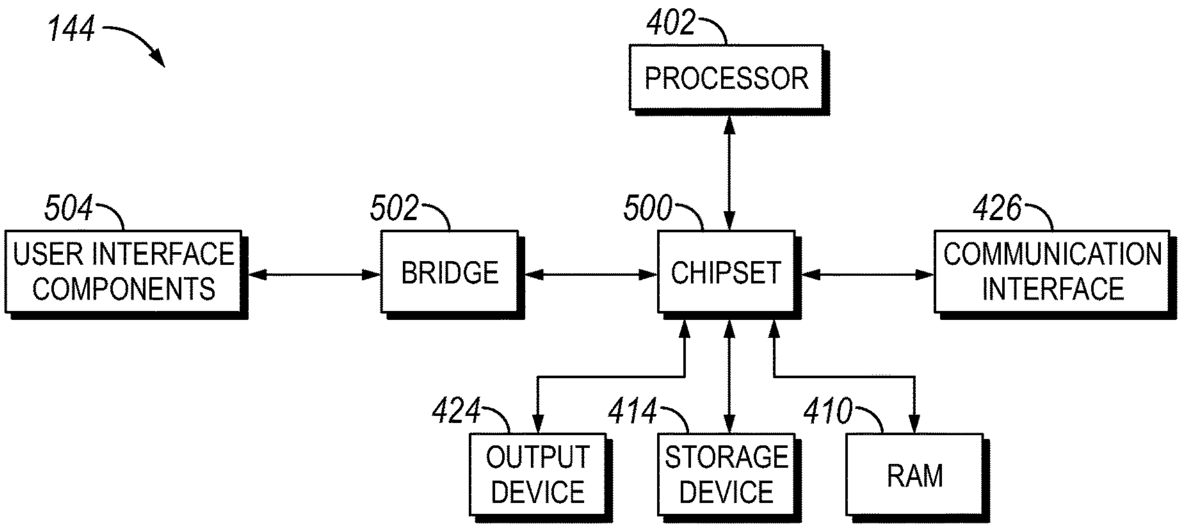
FIG. 5 illustrates another example information handling system having a chipset architecture that may be used in executing the described method and generating and displaying a graphical user interface.

FIG. 5 illustrates another example information handling system 144 having a chipset architecture that may be used in executing the described method and generating and displaying a graphical user interface (GUI). Information handling system 144 is an example of computer hardware, software, and firmware that may be used to implement the disclosed technology. Information handling system 144 may include a processor 402, representative of any number of physically and/or logically distinct resources capable of executing software, firmware, and hardware configured to perform identified computations. Processor 402 may communicate with a chipset 500 that may control input to and output from processor 402. In this example, chipset 500 outputs information to output device 424, such as a display, and may read and write information to storage device 414, which may include, for example, magnetic media, and solid-state media.

Chipset 500 may also read data from and write data to RAM 410. A bridge 502 for interfacing with a variety of user interface components 504 may be provided for interfacing with chipset 500. Such user interface components 504 may include a keyboard, a microphone, touch detection and processing circuitry, a pointing device, such as a mouse, and so on. In general, inputs to information handling system 144 may come from any of a variety of sources, machine generated and/or human generated.

Chipset 500 may also interface with one or more communication interfaces 426 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 402 analyzing data stored in storage device 414 or RAM 410.

Further, information handling system 144 receives inputs from a user via user interface components 504 and executes appropriate functions, such as browsing functions by interpreting these inputs using processor 402.

In examples, information handling system 144 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

During the logging operations of FIG. 1, information handling system 144 may process different types of real time data and post-process data originated from varied sampling rates and various sources, such as diagnostics data, sensor measurements, operations data, and or the like as collected by acoustic logging tool 100. (e.g., referring to FIG. 1). These measurements from the acoustic logging tool 100 may allow for information handling system 144 to perform real-time assessments of the acoustic logging operation.

Figure 6:
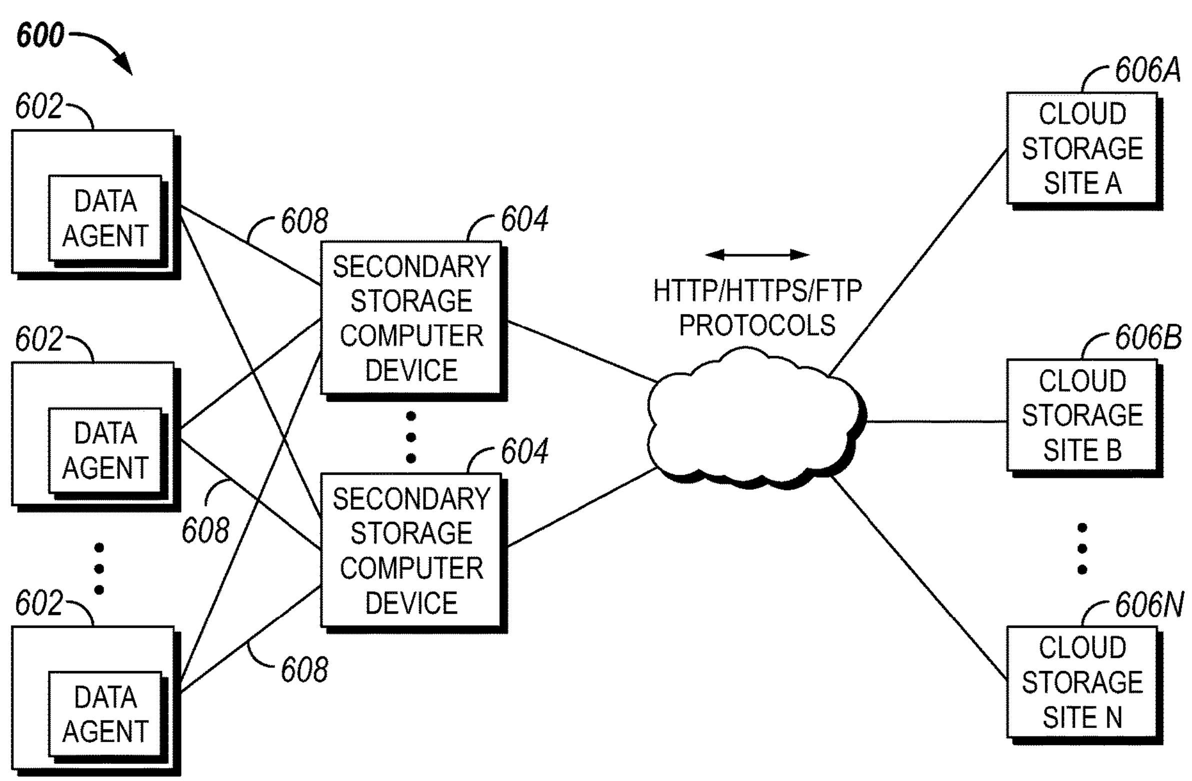
FIG. 6 illustrates an example of an arrangement of resources in a computing network according to an embodiment of the present disclosure.

FIG. 6 illustrates an example of one arrangement of resources in a computing network 600 that may employ the processes and techniques described herein, although many others are of course possible. As noted above, an information handling system 144, as part of their function, may utilize data, which comprises files, directories, metadata (e.g., access control list (ACLS) creation/edit dates associated with the data, etc.), and other data objects. The data on the information handling system 144 is typically a primary copy (e.g., a production copy). During a copy, backup, archive or other storage operation, information handling system 144 may send a copy of some data objects (or some components thereof) to a secondary storage computing device 604 by utilizing one or more data agents 602.

A data agent 602 may be a desktop application, website application, or any software-based application that is run on information handling system 144. As illustrated, information handling system 144 may be disposed at any well site (e.g., referring to FIG. 1) or at an offsite location. The data agent may communicate with a secondary storage computing device 604 using communication protocol 608 in a wired or wireless system. The communication protocol 608 may function and operate as an input to a website application. In the website application, field data related to pre- and post-operations, notes, and the like may be uploaded. Additionally, information handling system 144 may utilize communication protocol 608 to access processed measurements, troubleshooting findings, historical run data, and/or the like. This information is accessed from secondary storage computing device 604 by data agent 602, which is loaded on information handling system 144.

Secondary storage computing device 604 may operate and function to create secondary copies of primary data objects (or some components thereof) in various cloud storage sites 606A, 606B . . . 606N. Additionally, secondary storage computing device 604 may run determinative algorithms on data uploaded from one or more information handling systems 144, discussed further below. Communications between the secondary storage computing devices 604 and cloud storage sites 606A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 606A-N, the secondary storage computing device 604 may also perform local content indexing and/or local object-level, sub-object-level or block-level deduplication when performing storage operations involving various cloud storage sites 606A-N. Cloud storage sites 606A-N may further record and maintain logs for each downhole operation or run, store repair and maintenance data, store operational data, and/or provide outputs from determinative algorithms that are located in cloud storage sites 606A-N. In a non-limiting example, this type of network may be utilized as a platform to store, backup, analyze, import, preform extract, transform and load ("ETL") processes, mathematically process, apply machine learning algorithms, and interpret the data acquired by one or more acoustic logs.

Using methods and systems described above, logging operations may allow for matching theoretical values for $A_0$ mode attenuation calculations from waveform data collected by acoustic logging tool 100. This may provide more reliable evaluations of annular conditions even in challenging conditions. Additionally, such data collection with optimized angle, transducer-casing offset, and frequencies may allow for imaging up to the cement-formation or cement-second casing interfaces in difficult conditions.

Figure 7:
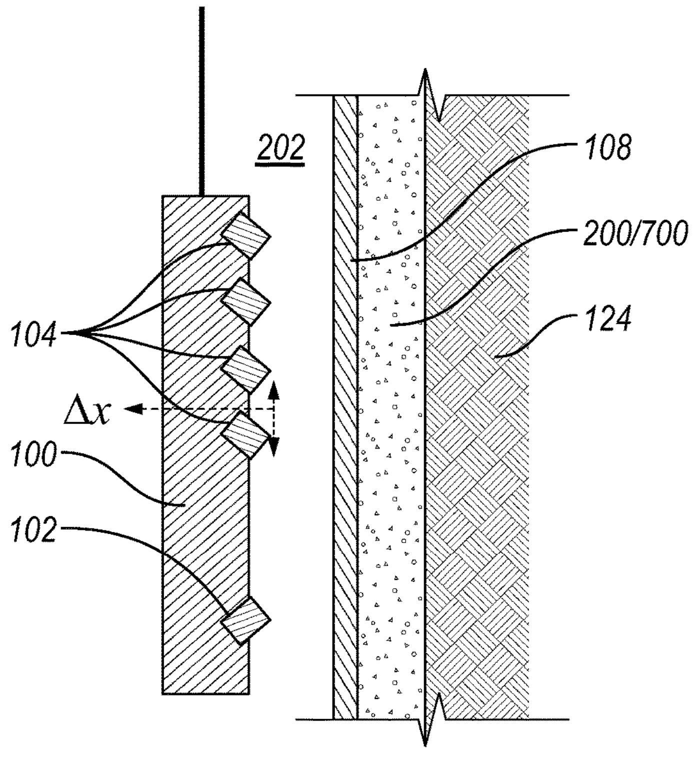
FIG. 7 is an example of a logging operation for cement evaluation.

FIG. 7 illustrates acoustic logging tool 100 during logging operations. As illustrated, acoustic logging tool 100 may comprise a pitch-catch configuration of a transmitter 102 and a plurality of receivers 104 that form a receiver array. Receivers 104 may collect flexural wave data from casing string 108. During logging operation, acoustic waveforms may be transmitted from transmitter 102 through a mud 202 (light or heavy) to casing string 108. The acoustic waveforms may interact with casing string 108, material 200/cement 700, and formation 124. The interactions may form lamb waveforms, which may be sensed and/or recorded by receivers 104. The measurements taken of the lamb waveforms may but utilized in least squares for flexural ($A_0$) attenuation computation and hence a more reliable estimate may be obtained.

Lamb waves may be generated in a fluid loaded elastic plate when excited by energy from a transmitter 102. Such modes may be generated in curved casing string 108 as encountered in a cased well setting. The curved surface of a casing string 108 may be considered as a flat layer for generation and analysis of such wave modes due to the small wavelength of the directional ultrasonic wave that is used for such purposes. The frequencies and angles at which various Lamb wave modes may be generated may be determined from theoretical dispersion curves computed for a particular casing-loading fluid combination scenario.

Figure 8:
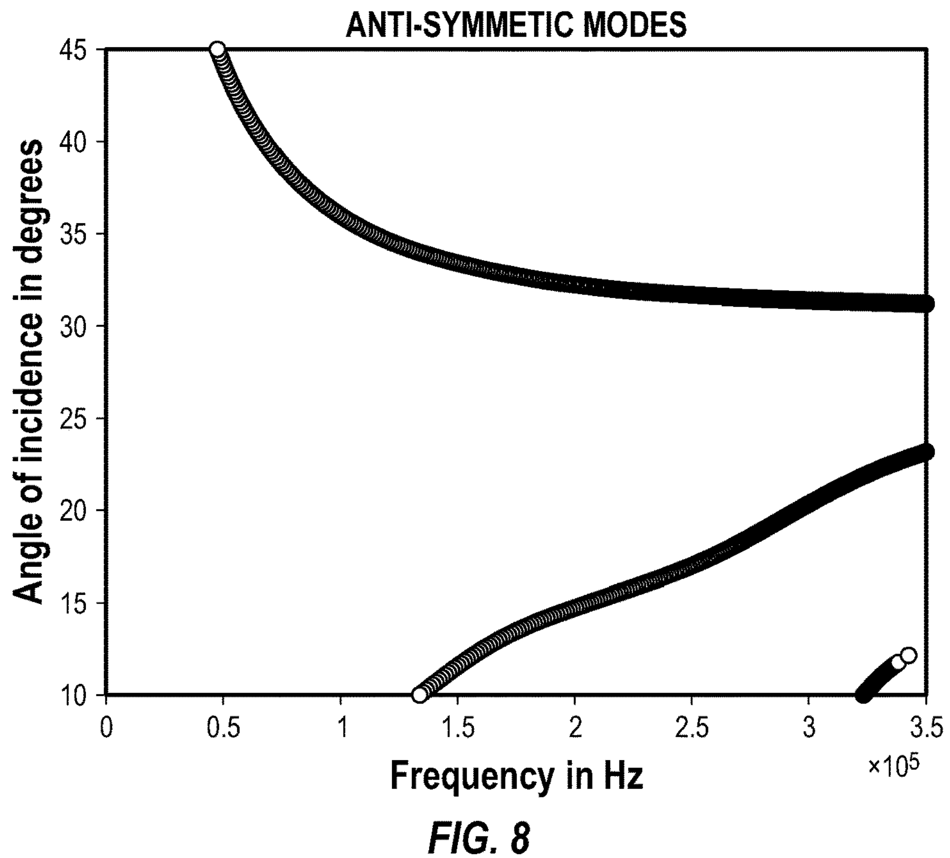
FIG. 8 a graph showing $A_0$ dispersion curve for a steel casing with 0.6 inch (1.5 cm) thickness.
Figure 9:
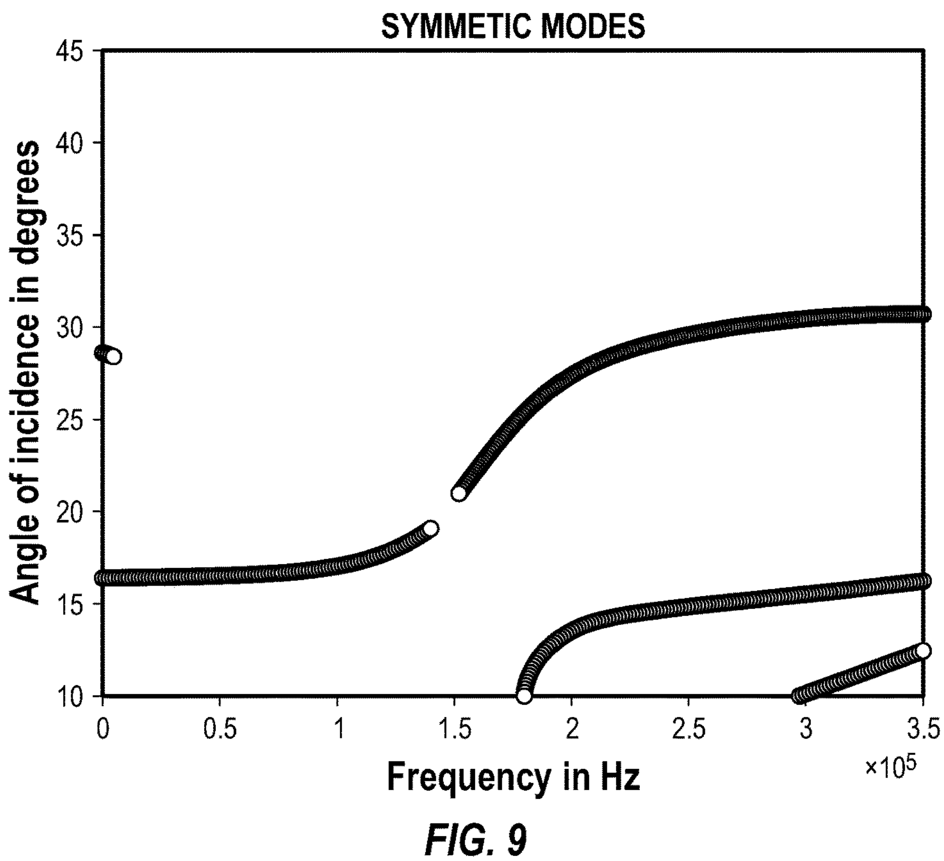
FIG. 9 is a graph showing $S_0$ dispersion curve for a steel casing with 0.6 inch (1.5 cm) thickness.

FIG. 8 is a graph showing $A_0$ dispersion curve for a steel casing with 0.6 inch (1.5 cm) thickness and water as the loading fluid in which transmitter 102 may be placed. It should be noted that dispersion curves may be created for any scenario in which logging operations may be performed. Scenarios may include casing properties and fluids within casing string 108. Using these properties, such as, casing steel compressional and shear wave speeds, casing steel thickness and the sound speed in the fluid in which transmitter 102 is dipped, a dispersion equation is solved to get the dispersion curves for various lamb wave modes. The dispersion curves are in the frequency-phase velocity domain. The phase velocities of various wave modes in the casing steel may be converted to angle of incidence using the sound speed in the fluid by applying Snell's Law. FIG. 9 is a graph showing $S_0$ dispersion curve for a steel casing with 0.6 inch (1.5 cm) thickness and water as the loading fluid in which transmitter 102 may be placed. Theoretical curves that are graphed in FIGS. 8 and 9 may be used to determine the optimal angle of incidence of energy from transmitter 102 and central frequency and bandwidth of the drive pulse to use to excite transmitter 102 and hence casing string 108. Thereby generate particular wave modes such as $A_0$ (also known as flexural mode). The angle of incidence may be controlled by using a collimated source transmitter 102 and having a mechanism to physically control the angle of the transmitter 102. A controlled drive pulse may be mathematically generated by an information handling system disposed at surface, on acoustic logging tool 100, or at least partially at surface and on acoustic logging tool 100 and fed into the firing control electronics for transmitter 102.

Figures 10A, 10B, 11A, 11B:
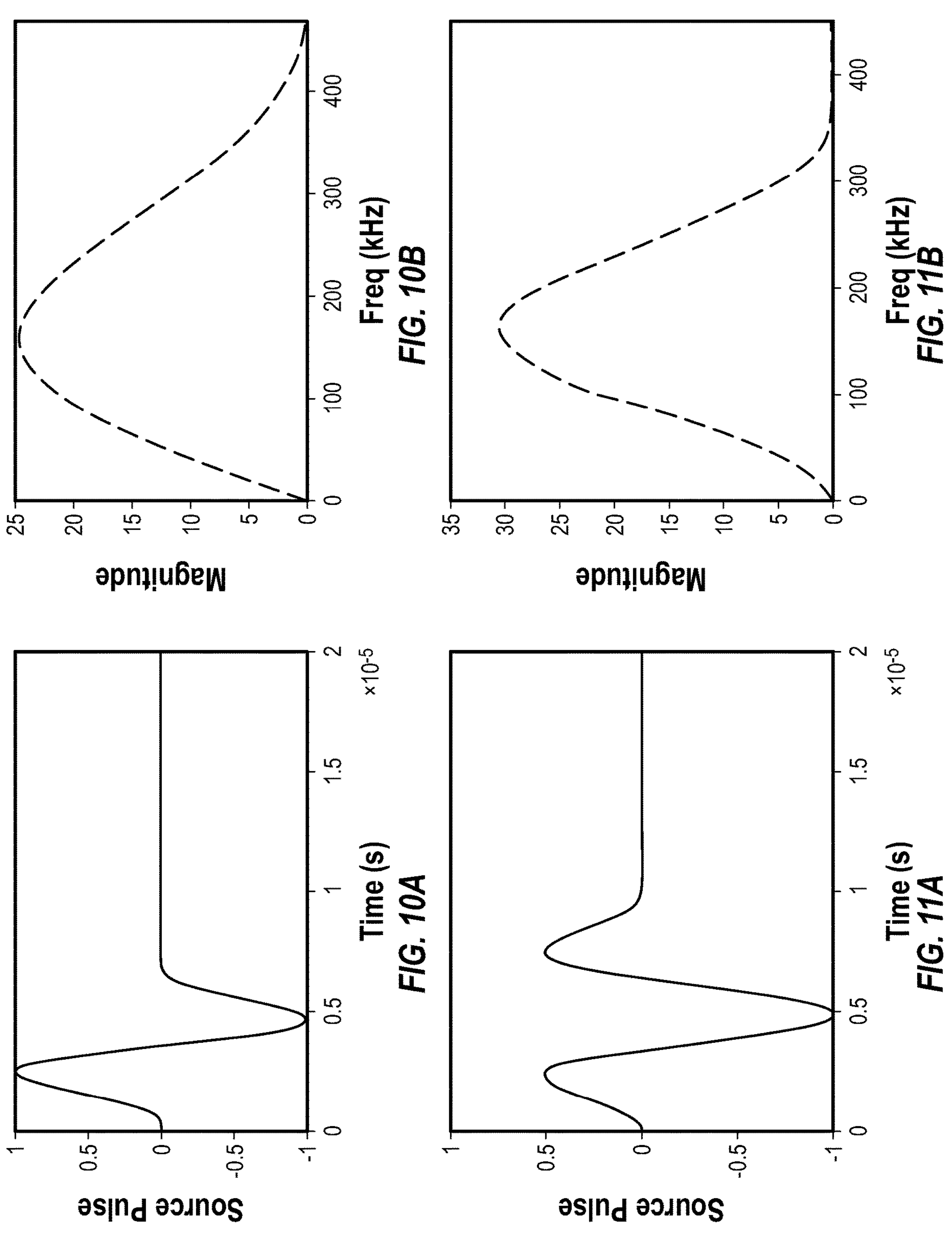
FIG. 10A is a graph of a drive pulse.
FIG. 10B is a graph of a frequency spectrum from the drive pulse.
FIG. 11A is a graph of a second drive pulse.
FIG. 11B is a graph of a frequency spectrum for the second drive pulse.

FIGS. 10A&B and FIGS. 11A&B, illustrate a drive pulse in a Blackman-Harris window with central frequency (160 Khz) and band widths that reduce contribution from unwanted wave modes and enhance contribution from wave modes of interest. For example, $A_0$ mode may be generated while reducing $S_0$ mode energy by using such drive pulses in combination with angle controlled collimated transducers for a 0.6 inch (1.5 cm) thick steel casing string 108. FIGS. 10A&B and FIGS. 11A & B show drive pulse shape in A and frequency spectrum in B.

Such controlled angle of incidence and frequencies may help generate $A_0$ mode, for example in a range of casing thicknesses and is not limited to what may be called thin or thick casing in the cement evaluation context. It is to be noted here that such controlled frequency drive pulses help generating pure wave modes while avoiding other modes. It also helps in reducing the impact of lower frequencies related dispersion of wavelet. However, if some lower frequencies still pose an issue from the perspective of data processing, then those low frequencies may be filtered by applying a low-cut filter. In a cement evaluation in cased well scenario $A_0$, $S_1$, and $S_0$ may be of interest and the idea of controlled transmitter firing for generating high SNR data for those specific wave modes applies to all three. The systems and methods described above may be utilized in a workflow for computing lamb wave mode attenuation.

Figure 12:
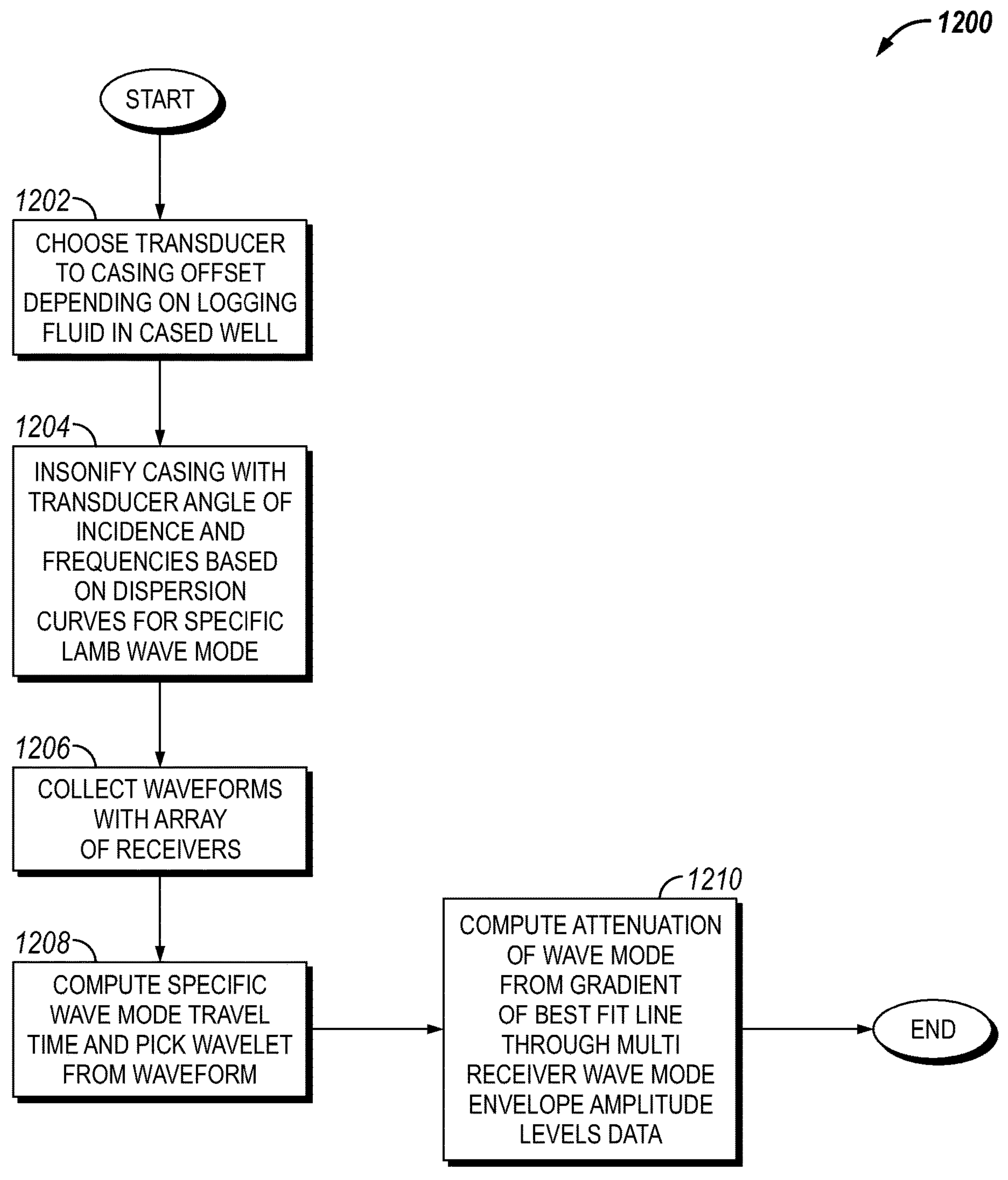
FIG. 12 is a workflow for computing attenuation of a waveform.

FIG. 12 illustrates workflow 1200 for identifying attenuation of a lamb wave mode. Workflow 1200 may be at least partially performed on information handling system 144. As illustrated, workflow 1200 may begin with block 1202. In block 1202, the transmitter to casing offset is chosen based at least in part on logging fluid within the cased wellbore 110 (i.e., referring to FIG. 1). As noted above, angle of incidence and transducer drive pulse may play a role in acquiring data that is accurate, reliable, and complete, also known as high fidelity data or a high signal to noise ratio (SNR). Another factor that may help increase SNR is transducer-casing offset. If the logging fluid is attenuative then the data quality may benefit from a lower offset. Physically that may be controlled in a number of ways including completely manual to automatic mechanisms. At ultrasonic frequencies (say >80 Khz), the logging fluid attenuation may be significant, for example, 7 db/inch at 200 Khz. Thus, the offset may be chosen depending on the fluid in a particular scenario. An offset may be chosen to achieve SNR of at least 16 db despite attenuation due to logging fluid. The signal transmitted at an offset may be the flexural wave mode arrival on the received waveform. After an offset is selected, logging operations may be performed utilizing acoustic logging tool 100.

In block 1204, casing string 108 may be insonified with acoustic waveforms from transmitter 102. This may be performed at a transmitter angle of incidence and frequencies based on dispersion curves for specific lamb wave modes. As discussed above, dispersion curves (such as those in FIGS. 10A & B and FIGS. 11A & B) may be utilized to determine angle of incident and frequency for drive pulse of transmitter 102. When reviewing dispersion curves, the chosen frequency and angle of incidence should be variables which are not in a highly dispersive portion of the dispersion curves. A highly dispersive portion of the dispersion curve is where the phase velocity changes rapidly with frequency. Therefore, in a dispersion curve already converted to the angle of incidence-frequency domain, the change in angle of incidence is rapid with change in frequency. For example, a portion of the dispersion curve, as seen in FIGS. 8 and 9, where the change in angle of incidence is greater than 2 degrees over a frequency change of 50 Khz may be considered highly dispersive. Generally, variables may be chosen from a dispersion curve in a symmetric ($S_0$) mode. By choosing the frequency and angle of incident of the drive pulse for transmitter 102, workflow 1200 prevents the steps of filtering data and prevents other modes from being produced. Once a drive pulse is selected from the dispersion curves, logging operations may be performed.

In block 1206, waveforms may be collected by receivers 104 in an array during logging operations. Once waveform data is acquired via control of angle of incidence, transmitter drive pulse, and offset from casing string 108, then wavelets may be chosen from the acquired waveforms.

In block 1208, specific wave mode travel times may be computed, and wavelets may be picked from the recorded waveforms in block 1206. Travel time for a source-receiver combination within an array may be computed using the following equation for $A_0$ mode (or flexural mode)

$$t = 2 * \frac{\frac{d_{standoff}}{\cos\theta_0}}{vp_{fluid}} + \frac{x - 2 * d_{standoff} * \tan\theta_0}{vg_{flex}} \tag{1}$$

where $d_{standoff}$ is a distance of a transmitter from the pipe string, $\theta_0$ is a phase angle of a primary flexural mode, $vp_{fluid}$ is a compressional wave velocity of a fluid in the pipe string, $vg_{flex}$ is group velocity of flexural mode in the pipe string, and x is the distance between face centers of transmitter 102 and receiver 104 (e.g., referring to FIG. 1). Once arrival time is computed, a time window defined around that time helps in picking or identifying the specific wave mode in the waveform (like the $A_0$ or $S_0$ with its appropriately modified travel time equation). This specific wave mode energy in the waveform appears as a compact wavelet if the dispersive part of the dispersion curve is avoided.

In block 1210, attenuation of a lamb wave mode from gradient may be computed using best fit line through multi-receiver wave mode envelope amplitude level data, which is to say the amplitude values of the peak of the envelop of the wave mode (i.e., $A_0$) collected on multiple receivers in array. Thus, computation of flexural ($A_0$) attenuation may be accurately performed despite remaining noise related issues by utilizing data from an array of receivers in combination with a least squares approach. One way that we have used in our work is computing attenuation of the time domain envelope of the $A_0$ signal in the array waveforms from the gradient of the best fit line passing through envelope peaks expressed in db. The gradient gives $A_0$ attenuation in db/cm or db/inch depending on choice of distance unit. This may be performed after the $A_0$ energy has been identified on each receiver waveform in the array using Equation (1) and subsequent windowing around that computed travel time. In the selected time window, the peak of the waveform envelope is picked and stored for every receiver in the array. These values, after being expressed in db with respect to the value of the first receiver, for a vector Y. The distances of the receivers from the source transmitter for a vector X. If we plot Y vs X and then find the best fit line in a least squares sense using well established mathematical methods for linear regression, then the slope or gradient of this best fit line is what gives us the desired flexural attenuation value that is indicative of the annular material type.

Acquiring high quality data combined with array based least squares processing may mitigate noise issues and provide more reliable estimates of flexural attenuation even in challenging conditions including when array has receivers with some level of response imbalance among receivers. The methods and systems discussed above synthesize concepts from data acquisition and signal processing to compute flexural attenuation reliably. Additionally, the methods and systems may perform the operation in the frequency domain instead of time domain. Further, other waveform attributes outside attenuation may be computed using the methods and systems described above. For example, once the waveforms are collected using optimal choice of acquisition parameters like angle of incidence and offset from casing, waveform signal attributes like sum of absolute amplitudes, frequency domain phase information of the waveforms, amplitude attenuation at each frequency, and/or the like may be computed.

The methods and systems discussed above utilize optimal choice of angle of incidence and frequencies for exciting the source transmitter (based on dispersion curves) for collecting high SNR waveform data. The choice of these parameters along with choice of source-receiver transducer array offset from casing inner surface is governed by properties of the logging fluid and the casing (including its thickness). In addition to optimal choice of those parameters for any given logging scenario, waveforms may be collected with an array of receivers that may comprise at least three receivers. Such data may then be used to compute attenuation using methods for regression for more accuracy despite noise in the data. Current state of the art technology has a few fixed settings for angle of incidence, firing frequency and offset from casing. Additionally, only two receivers are utilized, which does not allow use of regression for computing attenuation and hence is more likely to be affected by noise.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the elements that it introduces. The systems and methods may comprise any of the various features disclosed herein, comprising one or more of the following statements.

Statement 1. A method may comprise selecting a transmitter to a casing offset for logging operations, wherein the transmitter is disposed on a logging tool, insonifying at least a part of a casing with the transmitter at an angle of incidence and collecting one or more waveforms with an array of receivers disposed on the logging tool. The method may further comprise identifying one or more wave mode travel times from the one or more waveforms, selecting one or more wavelets from the one or more waveforms, and identifying an attenuation of a lamb wave mode based at least in part on the one or more wave mode travel times and the one or more wavelets.

Statement 2: The method of statement 1, wherein the casing offset is chosen based at least in part on a logging fluid within a casing.

Statement 3: The method of any preceding statements 1 or 2, wherein the angle of incidence is at least partially formed from a frequency of the waveform.

Statement 4: The method of statement 3, wherein the frequency is chosen from a dispersion curve for the lamb wave mode.

Statement 5: The method of any preceding statements, 1, 2, or 3, wherein the attenuation of the lamb wave mode is at least partially identified from a gradient of a best fit line.

Statement 6: The method of statement 5, wherein the best fit line is found using at least squares.

Statement 7: The method of any preceding statements, 1-3 or 5, wherein the waveform is generated from a drive pulse.

Statement 8: The method of statement 7, wherein the drive pulse is chosen based at least in part on producing an identified wave mode.

Statement 9: The method of statement 8, wherein the identified wave mode is a flexural mode.

Statement 10: The method of any preceding statements, 1-3, 5, or 7, wherein the array of receivers is at least three receivers.

Statement 11: A system may comprise a logging tool. The logging tool may comprise a transmitter for insonifying at least a part of a casing at an angle of incidence and an array of receivers for collecting one or more waveforms. The system may further comprise an information handling system configured to identify one or more wave mode travel times from the one or more waveforms, select one or more wavelets from the one or more waveforms, and identify an attenuation of a lamb wave mode based at least in part on the one or more wave mode travel times and the one or more wavelets.

Statement 12: The system of statement 11, wherein the casing offset is chosen based at least in part on a logging fluid within a casing.

Statement 13: The system of any preceding statements 11 or 12, wherein the angle of incidence is at least partially formed from a frequency of the waveform.

Statement 14: The system of statement 13, wherein the frequency is chosen from a dispersion curve for the lamb wave mode.

Statement 15: The system of any preceding statements 11, 12, or 13, wherein the attenuation of the lamb wave mode is at least partially identified from a gradient of a best fit line.

Statement 16: The system of statement 15, wherein the best fit line is found using at least squares.

Statement 17: The system of any preceding statements 11-13 or 15, wherein the waveform is generated from a drive pulse.

Statement 18: The system of statement 17, wherein the drive pulse is chosen based at least in part on producing an identified wave mode.

Statement 19: The system of statement 18, wherein the identified wave mode is a flexural mode.

Statement 20: The system of any preceding statements 11-13, 15, or 17, wherein the array of receivers is at least three receivers.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
- selecting a transmitter to a casing offset for logging operations based at least in part on a logging fluid within the casing, wherein the transmitter is a collimated transducer that is disposed on a logging tool;
- insonifying at least a part of a casing with the transmitter at an angle of incidence;
- collecting one or more waveforms with an array of receivers disposed on the logging tool;
- identifying one or more wave mode travel times from the one or more waveforms;
- selecting one or more wavelets from the one or more waveforms;
- identifying an attenuation of a lamb wave mode based at least in part on the one or more wave mode travel times and the one or more wavelets;
- wherein the angle of incidence is selected based on the insonifying frequency; and
- wherein the insonifying frequency is chosen from a dispersion curve for the lamb wave mode.

2. The method of claim 1, wherein the casing offset is selected based at least in part on an attenuation of the logging fluid within a casing.

3. The method of claim 2, wherein the frequency is chosen from a dispersion curve for the lamb wave mode.

4. The method of claim 1, wherein the attenuation of the lamb wave mode is at least partially identified from a gradient of a best fit line.

5. The method of claim 4, wherein the best fit line is found using at least squares.

6. The method of claim 1, wherein the waveform is generated from a drive pulse.

7. The method of claim 6, wherein the drive pulse is chosen based at least in part on producing an identified wave mode.

8. The method of claim 7, wherein the identified wave mode is a flexural mode.

9. The method of claim 1, wherein the array of receivers is at least three receivers.

10. A system comprising:
- a logging tool comprising:
  - a transmitter for insonifying at least a part of a casing at an angle of incidence, wherein the transmitter is a collimated transducer; and
  - an array of receivers for collecting one or more waveforms; and
  - an information handling system configured to:
    - determine a transmitter to a casing offset based on sensor data, input data, or both;
    - identify one or more wave mode travel times from the one or more waveforms;
    - select one or more wavelets from the one or more waveforms;
    - identify an attenuation of a lamb wave mode based at least in part on the one or more wave mode travel times and the one or more wavelets;
  - wherein the angle of incidence is selected based on the insonifying frequency; and
  - wherein the insonifying frequency is chosen from a dispersion curve for the lamb wave made.

11. The system of claim 10, wherein the setinput data comprises a user selection is chosen based at least in part on a logging fluid within a casing.

12. The system of claim 11, wherein the frequency is chosen from a dispersion curve for the lamb wave mode.

13. The system of claim 10, wherein the attenuation of the lamb wave mode is at least partially identified from a gradient of a best fit line.

14. The system of claim 13, wherein the best fit line is found using at least squares.

15. The system of claim 10, wherein the waveform is generated from a drive pulse.

16. The system of claim 15, wherein the drive pulse is chosen based at least in part on producing an identified wave mode.

17. The system of claim 16, wherein the identified wave mode is a flexural mode.

18. The system of claim 10, wherein the array of receivers is at least three receivers.

* * * * *